(12) United States Patent
Bouley et al.

(10) Patent No.: US 12,468,524 B2
(45) Date of Patent: Nov. 11, 2025

(54) EXTENDIBLE, RECURSIVE CONFIGURATION PACKAGES THAT PROVIDE VERSIONING TRACE-ABILITY AND TESTABILITY

(71) Applicant: FAIR ISAAC CORPORATION, Minneapolis, MN (US)

(72) Inventors: Ken Bouley, Point Reyes Station, CA (US); Sathya Sekar, Mandur (IN)

(73) Assignee: Fair Isaac Corporation, Minneapolis, MN (US)

( * ) Notice: Subject to any disclaimer, the term of this patent is extended or adjusted under 35 U.S.C. 154(b) by 133 days.

(21) Appl. No.: 18/488,861

(22) Filed: Oct. 17, 2023

(65) Prior Publication Data
US 2025/0123830 A1    Apr. 17, 2025

(51) Int. Cl.
| | | |
|---|---|---|
| G06F 9/445 | (2018.01) | |
| G06F 8/65 | (2018.01) | |
| G06F 8/71 | (2018.01) | |
| G06F 9/455 | (2018.01) | |
| G06F 17/00 | (2019.01) | |

(Continued)

(52) U.S. Cl.
CPC . *G06F 8/65* (2013.01); *G06F 8/71* (2013.01)

(58) Field of Classification Search
CPC .......... G06F 8/65; G06F 8/71; G06F 9/45558; G06F 3/0622; G06F 13/4221; G06F 13/4282; G06F 13/4068; G06F 9/4856; G06F 3/0659; G06F 11/2023; G06F 13/1668; G06F 11/2007; G06F 3/0631; G06F 3/0673; G06F 15/17331; G06F 9/5016

See application file for complete search history.

(56) References Cited

U.S. PATENT DOCUMENTS

| | | |
|---|---|---|
| 5,497,334 A | 3/1996 | Russell et al. |
| 5,517,645 A | 5/1996 | Stutz et al. |

(Continued)

OTHER PUBLICATIONS

Andreas Schraitle "Provisioning of Customizable Pattern-based Software Artifacts into Cloud Environments", Institute of Architecture of Application Systems, University of Stuttgart, Stuttgart, Germany, Sep. 6, 2013, pp. 1-111. (Year: 2013).

(Continued)

*Primary Examiner* — Thuy Dao

(57) ABSTRACT

Provided herein is A computer-implemented method for generating a configuration package, comprising: maintaining a list of capabilities at a computational platform, wherein the list of capabilities is associated with a list of configurations stored in a configuration repository; detecting, by one or more processors, an additional capability at the computational platform; automatically adding, by the computational platform, a configuration associated with the additional capability to the configuration repository; receiving, by a packaging service, a user-generated input from a user, wherein the user-generated input configures a solution service to generate solution data by one or more capabilities, the user-generated input selecting the one or more capabilities at the computational platform, and generating, by the packaging service, a configuration package comprising one or more configurations associated with the selected one or more capabilities.

20 Claims, 7 Drawing Sheets

(51) Int. Cl.
*G06N 5/00* (2023.01)
*H04L 29/06* (2006.01)

(56) References Cited

U.S. PATENT DOCUMENTS

| | | | |
|---|---|---|---|
| 6,615,199 | B1 | 9/2003 | Bowman-Amuah |
| 6,931,599 | B1 | 8/2005 | Korenshtein |
| 7,272,820 | B2 | 9/2007 | Klianev |
| 7,665,064 | B2 | 2/2010 | Able et al. |
| 7,827,528 | B2 * | 11/2010 | Sattler ................ G06F 8/71 717/121 |
| 8,386,525 | B2 | 2/2013 | Pace et al. |
| 8,417,715 | B1 | 4/2013 | Bruckhaus et al. |
| 8,417,938 | B1 | 4/2013 | Considine et al. |
| 8,584,087 | B2 * | 11/2013 | Rasch ............. G06F 9/44505 717/121 |
| 9,588,790 | B1 | 3/2017 | Wagner et al. |
| 9,690,575 | B2 | 6/2017 | Prismon et al. |
| 10,162,630 | B2 | 12/2018 | Bouley et al. |
| 10,956,152 | B2 | 3/2021 | Bouley et al. |
| 11,392,374 | B2 | 7/2022 | Bouley et al. |
| 2002/0104068 | A1 | 8/2002 | Barrett et al. |
| 2003/0229543 | A1 | 12/2003 | Zimmerman et al. |
| 2005/0021381 | A1 | 1/2005 | Schnoerer et al. |
| 2005/0085937 | A1 | 4/2005 | Goodwin et al. |
| 2005/0278348 | A1 | 12/2005 | Falter et al. |
| 2007/0220022 | A1 | 9/2007 | Lankinen et al. |
| 2008/0172673 | A1 | 7/2008 | Naik |
| 2008/0209392 | A1 | 8/2008 | Able et al. |
| 2008/0307211 | A1 | 12/2008 | An et al. |
| 2009/0257436 | A1 | 10/2009 | Qu |
| 2010/0306772 | A1 | 12/2010 | Arnold et al. |
| 2010/0333083 | A1 | 12/2010 | Chancey et al. |
| 2012/0185821 | A1 | 7/2012 | Yaseen et al. |
| 2013/0006707 | A1 | 1/2013 | Ssubhanjan |
| 2013/0239089 | A1 | 9/2013 | Eksten et al. |
| 2014/0052773 | A1 | 2/2014 | Deng et al. |
| 2014/0075032 | A1 | 3/2014 | Vasudevan et al. |
| 2014/0075033 | A1 | 3/2014 | Doering et al. |
| 2014/0143735 | A1 | 5/2014 | Dahn |
| 2014/0244799 | A1 | 8/2014 | Kundgol et al. |
| 2014/0250306 | A1 | 9/2014 | Ziegler |
| 2014/0278807 | A1 | 9/2014 | Bohacek |
| 2015/0058467 | A1 | 2/2015 | Douglas et al. |
| 2015/0067171 | A1 | 3/2015 | Yum et al. |
| 2015/0113160 | A1 | 4/2015 | Sun et al. |
| 2015/0156280 | A1 | 6/2015 | Vaswani et al. |
| 2015/0157226 | A1 | 6/2015 | Strahl et al. |
| 2015/0205602 | A1 | 7/2015 | Prismon et al. |
| 2017/0075669 | A1 | 3/2017 | Charters et al. |
| 2017/0308793 | A1 | 10/2017 | Prismon et al. |
| 2017/0308822 | A1 | 10/2017 | Prismon et al. |
| 2018/0246960 | A1 | 8/2018 | Rathod |

OTHER PUBLICATIONS

Azarmi, Bahaaldine. "Scalable Big Data Architecture: A Practitioners Guide to Choosing Relevant Big Data Architecture", Apress, Berkeley, Originally Published Dec. 30, 2015, pp. 1-142. (Year: 2015).

*Decision Model and Notation.* Object Management Group, 2015. 182 pages.

Fallon, L. et al. (2014). "Applying Semantics to Optimize End-User Services in Telecommunication Networks", OTM Confederated International Conferences, "On the Move to Meaningful Internet Systems", Springer, Berlin, Heidelberg, 2014, pp. 1-10.

Garcia, Bernat Ribes. "OpenDaylight SDN controller platform", Escola Tecnica d'Enginyeria de Telecomunicacioneselona, Universitat Politecnica de Catalunya, Barcelona, Oct. 2015, pp. 1-170. (Year: 2015).

Gronroos, Marko. "Book of Vaadin", Vaadin 7 Edition, 6th Revision, Vaadin Ltd, Sep. 21, 2015, pp. 1-753. (Year: 2015) [PDF pp. 1-400].

Gronroos, Marko. "Book of Vaadin", Vaadin 7 Edition, 6th Revision, Vaadin Ltd, Sep. 21, 2015, pp. 1-753. (Year: 2015) [PDF pp. 401-756].

Hatcliff, John, et al., "Cadena: An Integrated Development, Analysis, and Verification Environment for Component-based Systems", ICSE '03, Portland, OR, May 3-10, 2003, 13 pages.

Hinkelmann, Knut et al. "The Knowledge Work Designer—Modelling Process Logic and Business Logic", GI-Edition Lecture Notes in Informatics, Modellierung 2016, Workshopband, Mar. 2-4, 2016, pp. 135-139. (Year: 2016).

Jayasinghe, Deepal, et. al. "Improving Performance and Availability of Services Hosted on IaaS Clouds with Structural Constraint-Aware Virtual Machine Placement." *2011 International Conference on Services Computing*, IEEE. pp. 72-79.

Lau, Kung-Kiu, et al., "Software Component Models", IEEE Transactions on Software Engineering, vol. 33, No. 10, Oct. 2007, pp. 709-724.

Li, Jim, et. al. "Fast Scalable Optimization to Configure Service Systems Having Cost and Quality of Service." *Proceedings of the 6th International Conference on Automatic Computing*, Jun. 15-19, 2009, Barcelona Spain, pp. 159-168.

Salatino et al. "Mastering JBoss Drools 6", Packt Publishing Open Source, Birmingham, Mar. 31, 2016, pp. 1-308) (Year: 2016).

* cited by examiner

EXTENDIBLE, RECURSIVE CONFIGURATION PACKAGES THAT PROVIDE VERSIONING TRACE-ABILITY AND TESTABILITY

TECHNICAL FIELD

The subject matter described herein relates to configuration software, for example configuring pre-compiled code frameworks.

BACKGROUND

Software is frequently sold or distributed as pre-compiled computer products that may be restricted by platform, language, etc. Software shared from user to user and for a wide variety of applications often needs customization to either be of use to the particular user or to be used on a particular machine, often involving the re-writing of code. The re-writing of code can result in variations in functionality or output as well as being difficult or impossible for the end-user.

SUMMARY

Methods, systems, and articles of manufacture, including computer program products, are provided for generating configuration packages for users. In one aspect, there is provided a system. The system may include at least one processor and at least one memory. The at least one memory may store instructions that result in operations when executed by the at least one processor. The operations may include: maintaining a list of capabilities at a computational platform, wherein the list of capabilities is associated with a list of configurations stored in a configuration repository; detecting, by one or more processors, an additional capability at the computational platform; automatically adding, by the computational platform, a configuration associated with the additional capability to the configuration repository; receiving, by a packaging service, a user-generated input from a user, wherein the user-generated input configures a solution service to generate solution data by one or more capabilities, the user-generated input selecting the one or more capabilities at the computational platform, and generating, by the packaging service, a configuration package comprising one or more configurations associated with the selected one or more capabilities.

In another aspect, there is provided a method. The method includes: maintaining a list of capabilities at a computational platform, wherein the list of capabilities is associated with a list of configurations stored in a configuration repository; detecting, by one or more processors, an additional capability at the computational platform; automatically adding, by the computational platform, a configuration associated with the additional capability to the configuration repository; receiving, by a packaging service, a user-generated input from a user, wherein the user-generated input configures a solution service to generate solution data by one or more capabilities, the user-generated input selecting the one or more capabilities at the computational platform, and generating, by the packaging service, a configuration package comprising one or more configurations associated with the selected one or more capabilities.

In another aspect, there is provided a computer program product including a non-transitory computer readable medium storing instructions. The operations include maintaining a list of capabilities at a computational platform, wherein the list of capabilities is associated with a list of configurations stored in a configuration repository; detecting, by one or more processors, an additional capability at the computational platform; automatically adding, by the computational platform, a configuration associated with the additional capability to the configuration repository; receiving, by a packaging service, a user-generated input from a user, wherein the user-generated input configures a solution service to generate solution data by one or more capabilities, the user-generated input selecting the one or more capabilities at the computational platform, and generating, by the packaging service, a configuration package comprising one or more configurations associated with the selected one or more capabilities.

In some variations, the determination of whether the one or more configurations are coherent includes analyzing compatibility between configurations associated with the selected one or more capabilities.

In some variations, the deployment service generates executable code from the generated configuration package.

In some variations, the packaging service facilitates the user to publish the generated configuration package. In some variations, the packaging service is agnostic to the list of capabilities at the computational platform.

In some variations, the packaging service is further configured to manage recursive inclusion of a plurality of configuration packages, allowing one or more configuration packages to contain other configuration packages.

In some variations, the recursive inclusion of a plurality of configuration packages comprises recursive inclusion by reference.

In some variations, the recursive inclusion of a plurality of configuration packages comprises recursive inclusion by copy.

In some variations, the packaging service is further configured to prevent self-referential recursiveness.

In some variations, the generated configuration package further comprises version information for the one or more configurations.

In some variations, the packaging service provides an interface for displaying historical edit data of the one or more configurations in the version information.

In some variations, the packaging service is configured to restore a past version of a configuration of the one or more configurations in response to a user request received via the interface.

In some variations, the packaging service is further configured to validate the generated configuration package by processing input data and comparing actual output with expected output data.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

BRIEF DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

Figure 1A:
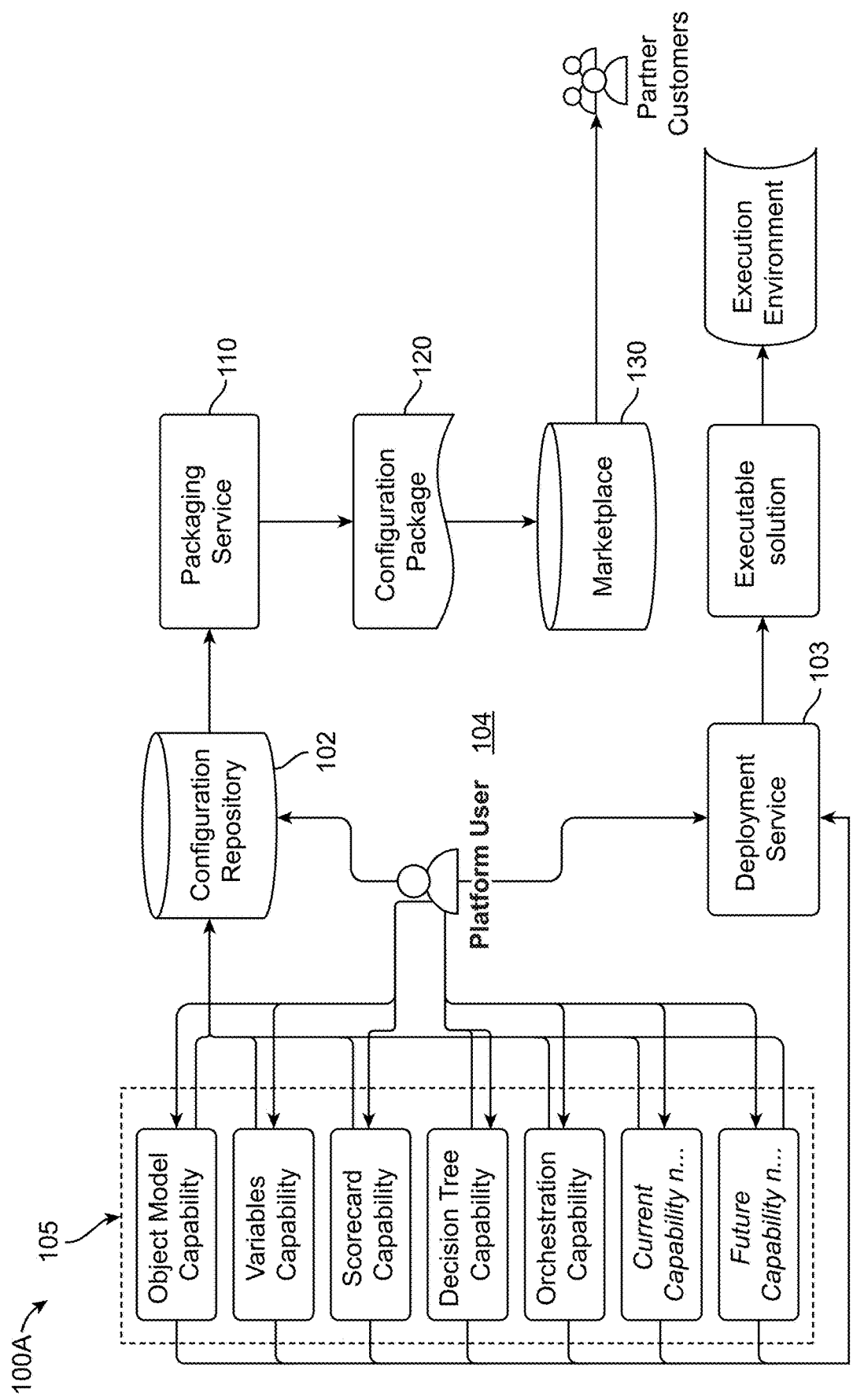
FIG. 1A is a diagram illustrating a platform for generating configuration packages, in an exemplary embodiment wherein the configuration packages are extendible, according to one or more implementations of the current subject matter.

When practical, like labels are used to refer to same or similar items in the drawings.

DETAILED DESCRIPTION

The details of one or more variations of the subject matter described herein are set forth in the accompanying drawings. While various implementations of the current subject matter have been shown and described herein, it will be obvious to those skilled in the art that such implementation are provided by way of example only. Numerous variations, changes, and substitutions may occur to those skilled in the art without departing from the current subject matter. It should be understood that various alternatives to the implementations of the current subject matter described herein may be employed.

FIG. 1A is a diagram illustrating a platform for generating configuration packages, according to one or more implementations of the current subject matter. As shown in FIG. 1A, in the domain of configuration packages within the evolving framework of the computational platform, provided herein is a set of embedded extensibility of the configuration packages, mirroring the extensibility of the computational platform. In some embodiments, the computational platform 100A may maintain a list of capabilities, as denoted by element 105. The computational platform 100A may be inherently designed to accommodate new capabilities, permitting the integration of capabilities, provided that these capabilities meet the requisite capability criteria. Consequently, any configuration associated with a capability may be automatically added to the configuration repository 102. In some embodiments, this integration may be enabled by the generic and capability-agnostic features embedded within the packaging service 110 as shown in FIG. 1A.

In some embodiments, as shown in FIG. 1A, the computational platform 100A is not bound to possess prior knowledge or expectations regarding the inclusion of additional capabilities and/or configurations. For instance, on the first day of platform deployment, inclusive of the packaging service 110, if the platform comprises capabilities A, B, and C, the packaging service 110 may construct configuration packages 120 comprising A-configuration, B-configuration, and C-configuration. Then, on a subsequent day, should a new capability, such as Capability D, be integrated into the platform 110 A, the packaging service 110 may adeptly assemble packages comprising A-configuration, B-configuration, C-configuration, and D-configuration without necessitating alterations to the packaging service 110.

As such, the above described implementations may expand the mere inclusion of configurations associated with capabilities in configuration packages 120. In some embodiments, configuration packages 120 may be inherently modularized and easy to be deployed. This may mean that the application and/or API for the platform remains devoid of hard-coded references pertaining to the specific problem that configurations and eventual decision services aimed to resolve. For example, configuration packages 120 could tailor to address a spectrum of challenges spanning retail banking customer service, origination problems, fraud detection, and more. In some embodiments, the configuration package 120 may be an assembly for one or more artifacts that are specific to a particular domain. It may embody the capabilities and may be processed by the packaging services 110 and/or deployment service 103 responsible for packaging and deployment, both of which may be not related to any inherent business-specific purposes. The elements that are specific to a particular business may be integrated into the configuration package 120, and may be also present in an executable form within the service that is executable. This structure allows for a high degree of flexibility and adaptability to various business contexts. Under this configuration package implementation, the computational platform 100A remains adaptable to an array of business domains, ranging from healthcare to insurance and education, without necessitating alterations to the application or API. This versatility may be achieved by encapsulating business-specific intellectual property as data, rather than code, within configuration packages 120.

In some embodiments, further advantageously, the packaging service 110 may be designed to comprise not only agnosticism toward business domains but also toward the set of capabilities accessible to users configuring solutions and crafting configuration packages. This approach holds significant importance, for any new capabilities introduced to the computational platform, whether by the platform provider or by collaborative partners (an envisaged capability), may be automatically added and implemented by the package service 110. Consequently, the corresponding configurations associated with these new capabilities can be automatically added to the configuration repository, and then being added/deployed to be part of a configuration package. As such, this may effectively facilitate the commercialization of intellectual property rooted in additional functionalities, for example, being published at a marketplace, e.g., marketplace 130 as shown in FIG. 1A.

By aid of the computational platform 100A, the users 104 may configure solutions, for example, using a solution service to generate solution data by one or more capabilities. In some embodiments, the users 104 may enter an authoring environment of the platform 100A, and use the solution service to generate solution data in accordance with one or more capabilities. In some embodiments, under the authoring environment, the user may generate one or more input, wherein the user-generated input selecting the one or more capabilities at the computational platform 100A. These generated solutions (and the accompany solution data) may comprise a plurality of configurations, each may be linked to specific capabilities, respectively. For instance, data definitions may align with the Object Model Capability, Variable logic may align with the Variable Capability, and Scorecards may align with the Scorecard Capability, among others.

As shown in FIG. 1A, the computational platform 100A may comprise a deployment service 103. In some embodiments, the deployment service 103 may determine whether the one or more configurations are coherent with one another by deploying the one or more configurations as a group. For example, the deployment service 103 may analyze compatibility between configurations included in a configurations package to generate the solution. In some embodiments, the deployment service 103 may modify the configurations included in a configurations package to ensure compatibility between configurations. In some embodiments, the deployment service 103 may modify the configurations included in a configurations package to generate the executable solutions in an execution environment. In some embodiments, the deployment service 103 may generate executable code from the configuration package 120. In some embodiments, the deployment service 103 may facilitate a user to publish the generated configuration package, for example, at a marketplace 130. As shown in FIG. 1A, the published configuration package may be deployed by partner customers of the computation platform 100A.

Figure 1B:
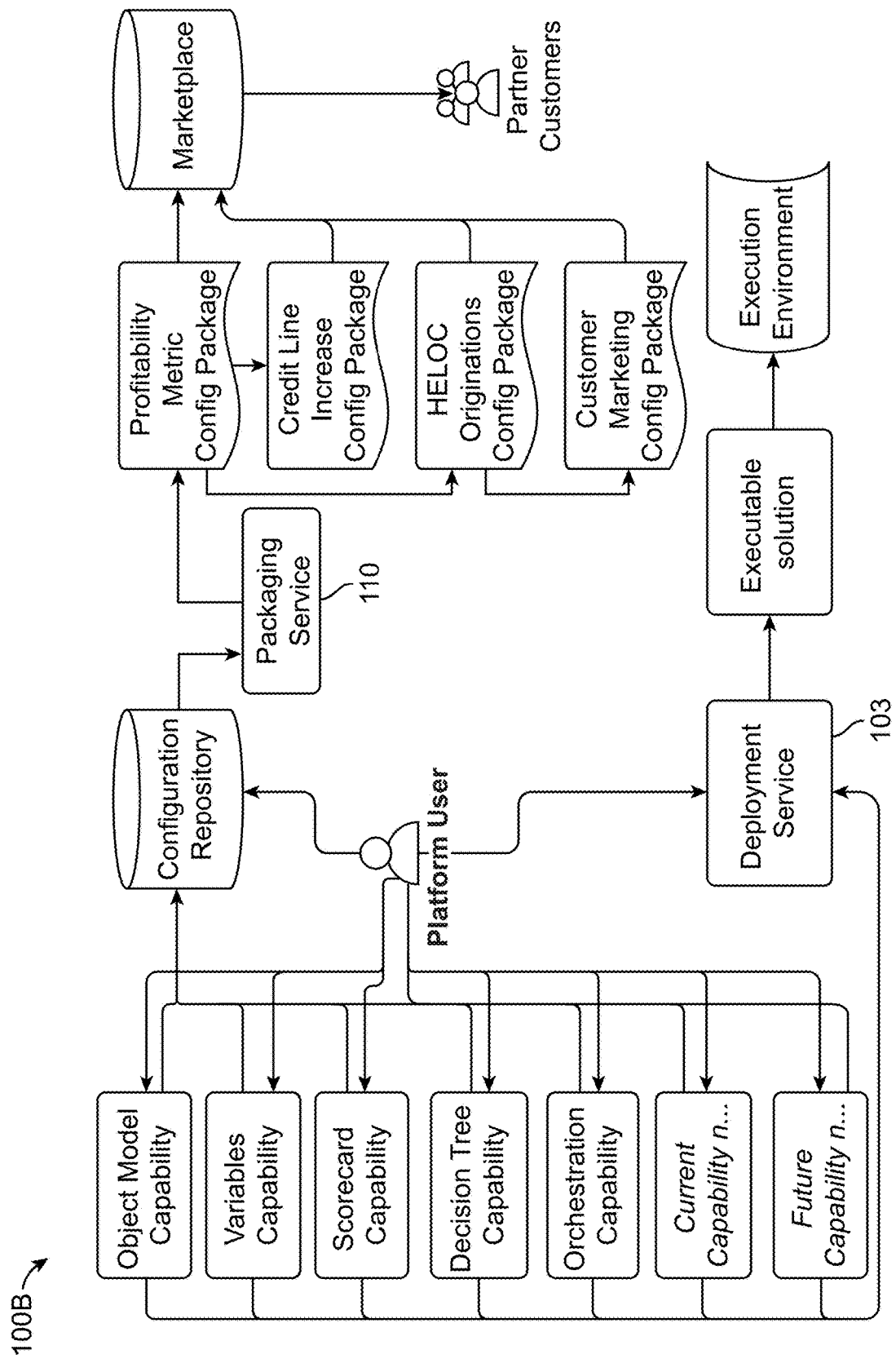
FIG. 1B is a diagram illustrating a platform for generating configuration packages, in an exemplary embodiment wherein the configuration packages are recursive, according to one or more implementations of the current subject matter.

FIG. 1B is a diagram illustrating a computational platform 100B for generating configuration packages. As shown in FIG. 1B, the computational platform 100B may facilitate functionalities that treat configuration packages 120 as recursive entities. In some embodiments, configuration packages 120 have the capacity to encompass other configuration packages 120, and they can, in turn, be encompassed within other configuration packages 120. It is essential to note that configuration packages 120 are designed to adhere to logical constraints, preventing scenarios where a configuration package 120 contains itself, i.e., preventing self-referential recursiveness. The computational platform 100B is designed to avert layers of recursiveness that might lead to self-references, such as the situation where Package A contains Package B, which further includes configuration package 120 C, and configuration package 120 C, in turn, includes configuration package 120 A.

In some embodiments, configuration packages 120 may encompass other configuration packages 120 through two distinct mechanisms: by reference or by copy. The 'copy' approach entails that when a user generates a configuration package 120, the platform includes another Package within it by duplicating the contents from the included configuration package 120 into the new one. This approach may be employed selectively, based on specific use cases. On the other hand, 'recursion by reference' may offer the advantage that any extensions or bug fixes introduced to the contained configuration packages 120 are automatically integrated into the configuration packages 120 that encompass them. It is worth noting that additional features and controls may be warranted to empower users to manage these inherited changes effectively. This is imperative because even though these changes may constitute improvements, they might disrupt business processes if introduced unexpectedly.

In some embodiments, configuration packages 120 may comprise multiple other configuration packages 120, employing a combination of the 'copy' and 'reference' mechanisms. The rationale behind this approach is multifaceted. In some instances, platform customers may be amenable to paying for 'recursion by reference,' enabling them to effectively subscribe to extensions and bug fixes. However, if customers are not inclined to avail themselves of this service, the alternative is to include the contained configuration packages 120 through 'copy,' resulting in platform customers receiving a snapshot of the contained configuration packages 120 at a specific point in time.

Use Case: Enhancing Retail Bank Customer Profiling with Recursive Configurations Packages In the dynamic landscape of retail banking, optimizing customer relationships and making data-driven decisions is paramount. To achieve this, a configuration package that encapsulates a Profitability Metric for retail bank customers may have been developed. This metric serves as a numeric representation of a customer's profitability to the bank, factoring in expected revenues and the anticipated costs of servicing the customer's account. This Profitability Metric Package may have been crafted to provide valuable insights into each customer's financial impact on the bank. In a scenario where a retail bank, e.g., Bank X, is in the process of refining its credit line increase decisions, the configuration package could be tailored to include the specific rules, algorithms, and criteria that Bank X uses to make these decisions. To accomplish this, for example Bank X may choose to leverage the power of configuration packages within the computational platform 100B. In some embodiments, Bank X may employ the Profitability Metric Package within the computational platform. This package has been designed to calculate the profitability of individual customers, helping Bank X distinguish high-value customers from those with lower profitability. The Profitability Metric Package may consider a multitude of variables, including expected revenues generated from each customer's accounts and the projected costs associated with servicing these accounts. By implementing this package, Bank X may gain a comprehensive understanding of each customer's financial worth to the bank. Recognizing the potential synergy between packages, Bank X may enhance its Credit Line Increase Decisions Package by incorporating the Profitability Metric Package. This integration may enable Bank X to make more informed credit line decisions. As such, when Bank X evaluates requests for credit line increases, it takes into account not only the traditional creditworthiness factors but also the customer's profitability as determined by the Profitability Metric Package. This holistic approach may allow Bank X to optimize offering credit line increases to customers who not only meet credit criteria but also contribute significantly to the bank's profitability.

In some embodiments, Bank X may operate in the Home Equity Line of Credit (HELOC) market and recognize that the Profitability Metric Package's insights can be invaluable in this domain. In some embodiments, the Profitability Metric Package may extend its influence into HELOC originations. By including this package in their HELOC Originations Package, Bank X ensures that profitability considerations are an integral part of their decision-making process when it comes to offering home equity lines of credit.

In some embodiments, Bank X may incorporate the Profitability Metric Package's value into their Customer Marketing Configuration package, which is responsible for tailoring marketing campaigns and promotions, for example, to existing customers. As such, when Bank X designs marketing initiatives, they have access to the Profitability Metric Package's insights. This may allow Bank X to target high-profitability customers with tailored offers, ensuring that marketing resources are allocated where they are likely to yield the greatest returns.

By using configuration packages that is capable of being recursive, Bank X may make data-driven decisions, enhance profitability, and offer a more personalized experience to their customers, ultimately strengthening their position in the competitive retail banking industry.

Figure 1C:
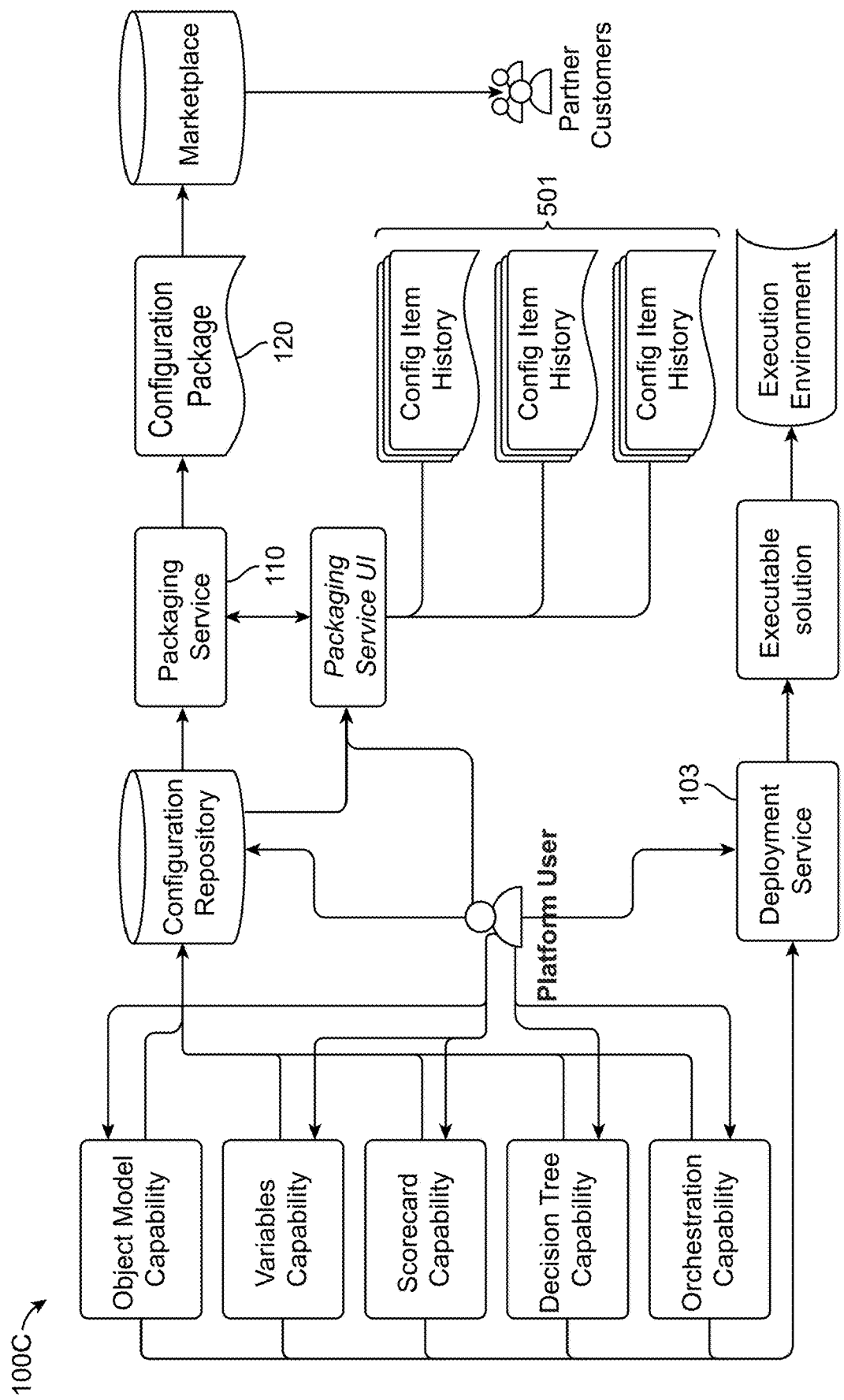
FIG. 1C is a diagram illustrating a platform for generating configuration packages, in an exemplary embodiment wherein the platform provides version trace-ability for the configuration packages, according to one or more implementations of the current subject matter.

FIG. 1C is a diagram illustrating a computational platform 100C for generating configuration packages. As shown in FIG. 1C, the computational platform 100C may facilitate functionalities that allow for configuration packages 120 to be associated with version information pertaining to its enclosed package elements. For example, in some embodiments, the configuration package may comprise version information pertaining to its enclosed package elements, spanning diverse entities, including but not limited to object models, trees, and scoring models. In some embodiments, the configuration package object model may extend its capabilities to comprise a dynamic range of versions. In some embodiments, these versions may be denoted in a fluid manner, encompassing a current version, −1, −2, and so forth, indefinitely. In some embodiments, the computational platform 100C may comprise capabilities that may offer users the ability to access a comprehensive edit history associated with configuration items (i.e., config. item history 501). As such, the config. item history 501 may provide user-generated annotations, distinctions between enhancements and bug fixes, and other insights that contribute to the supportability and auditability of these configuration items. In some embodiments, the packaging service may facilitate navigating the past versions for each configuration element at a granular level. This feature may allow for users to make informed decisions about reverting to prior versions when circumstances necessitate such actions. For example, consider a scenario where a configuration package includes scoring characteristics. In some embodiments, it might transpire that the logic governing a specific characteristic undergoes modifications in an attempt to rectify a bug. However, upon further evaluation, it may become evident that the original logic was indeed correct. In such cases, it is highly desirable to revert to an arbitrary past version of the configuration element, a capability facilitated by the packaging service.

In some embodiments, configuration packages may feature multiple versions of specific package elements tailored to distinct deployment contexts, such as different geographical regions or counties. This feature may enable users to precisely specify the utilization of version-specific configuration assets, thereby ensuring compliance with varying regulations or regional requirements.

In some embodiments, there exist configuration packages equipped with self-documenting descriptor files, cataloging the various versions of the encapsulated package elements. In some embodiments, the configuration packages may extend further by enabling a comprehensive examination, investigation, and manipulation of the version history of these elements. This functionality, often referred to as "time-machine" functionality, is different than the traditional perspective where a configuration package solely delineates its current contents. Instead, this version history functionality may encapsulate not only the current state but also the historical evolution of its constituent elements.

Figure 1D:
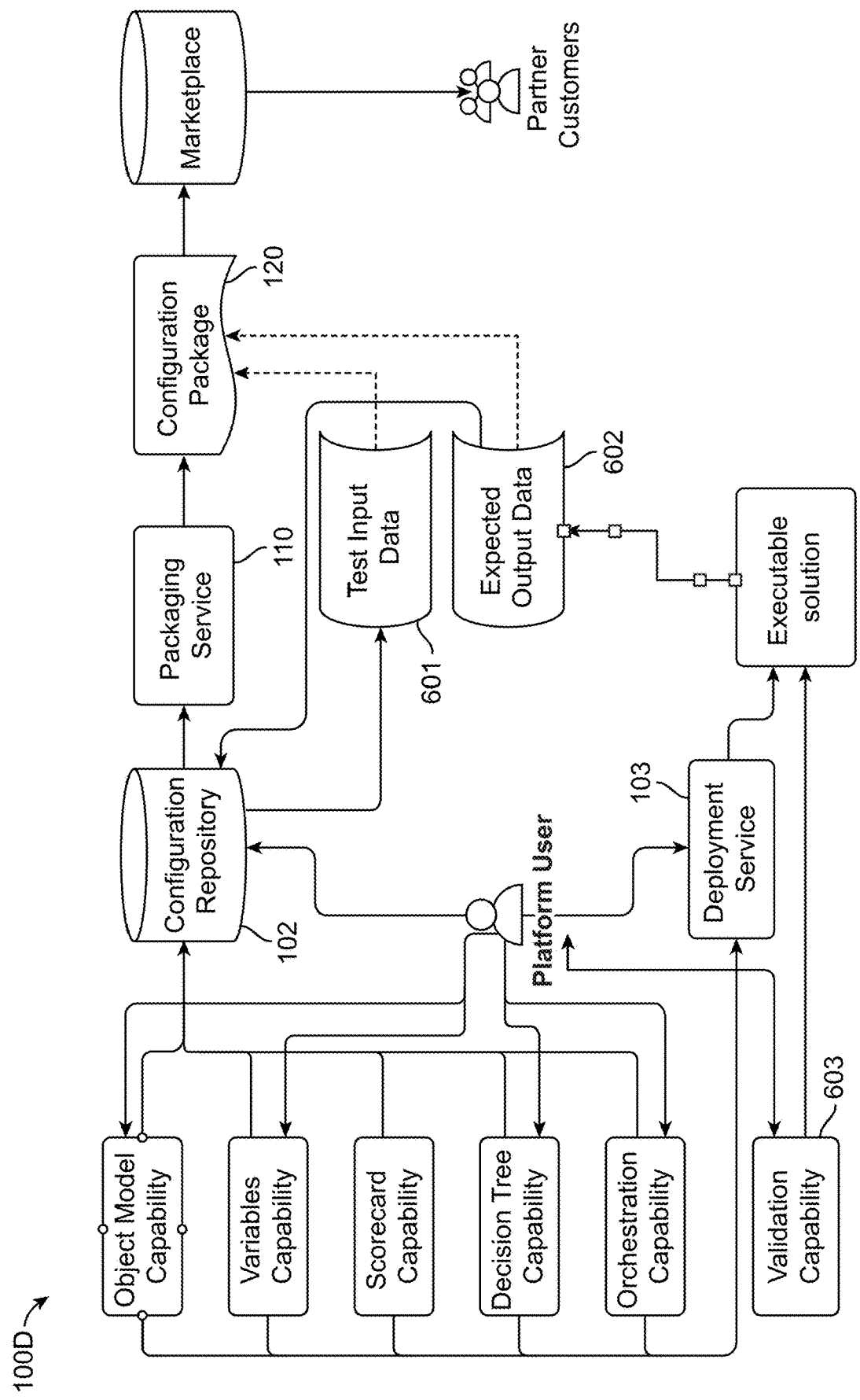
FIG. 1D is a diagram illustrating a platform for generating configuration packages, in an exemplary embodiment wherein the platform provides testability for the configuration packages according to one or more implementations of the current subject matter.

FIG. 1D is a diagram illustrating a computational platform 100D for generating configuration packages. As shown in FIG. 1D, the computational platform 100D may facilitate functionalities that allow for testing the configuration packages. In some embodiments, the configuration package 120 may extend its composition to comprise sample input data 601 and the corresponding expected results 602, which may serve as a means to substantiate the correctness of the configuration. This validation process can be advantageous, particularly after the configuration has been deployed as an executable solution or following modifications that anticipate specific changes in output, leading to the creation of a new version with expected results. Traditional configuration packages may be limited to incorporating user-entered configuration settings and accompanying documentation. As shown in FIG. 1D, the inclusion of Input/Output (I/O) data as a third asset type may be utilized. This data may work in tandem with the validation capability 603, to manage the stability and accuracy of configuration packages. In some embodiments, the computational platform 100D may incorporate the validation capability 603, an integral component that establishes the anticipated results for an executable solution based on a defined set of input data. The process may involve iterative steps, comprising the execution of the solution, examination of the output, and potential configuration adjustments, until the desired output is achieved. Once the correct expected results are determined, at the computational platform 100D, users may gain the ability to designate the input data 601 and expected output data 602 for inclusion within the configuration package itself. While FIG. 1D may depict the inclusion of input 601 and expected output 602 (collectively "validation data files") within the configuration package 120, it is important to note that these validation data files are effectively sourced from the repository 102, where they may be stored alongside other decision assets, including configurations.

In some embodiments, the validation process by the validation capability 603 operates independently from the consistency checks conducted within the deployment service 103. The deployment service 103 checks focus on establishing the configuration's validity to facilitate the execution of an executable decision service. On the other hand, in some embodiments, the validation process by the validation capability 603 focuses on determining the correctness of the configuration content to ensure that the output of the decision service aligns with expectations.

Figure 2:
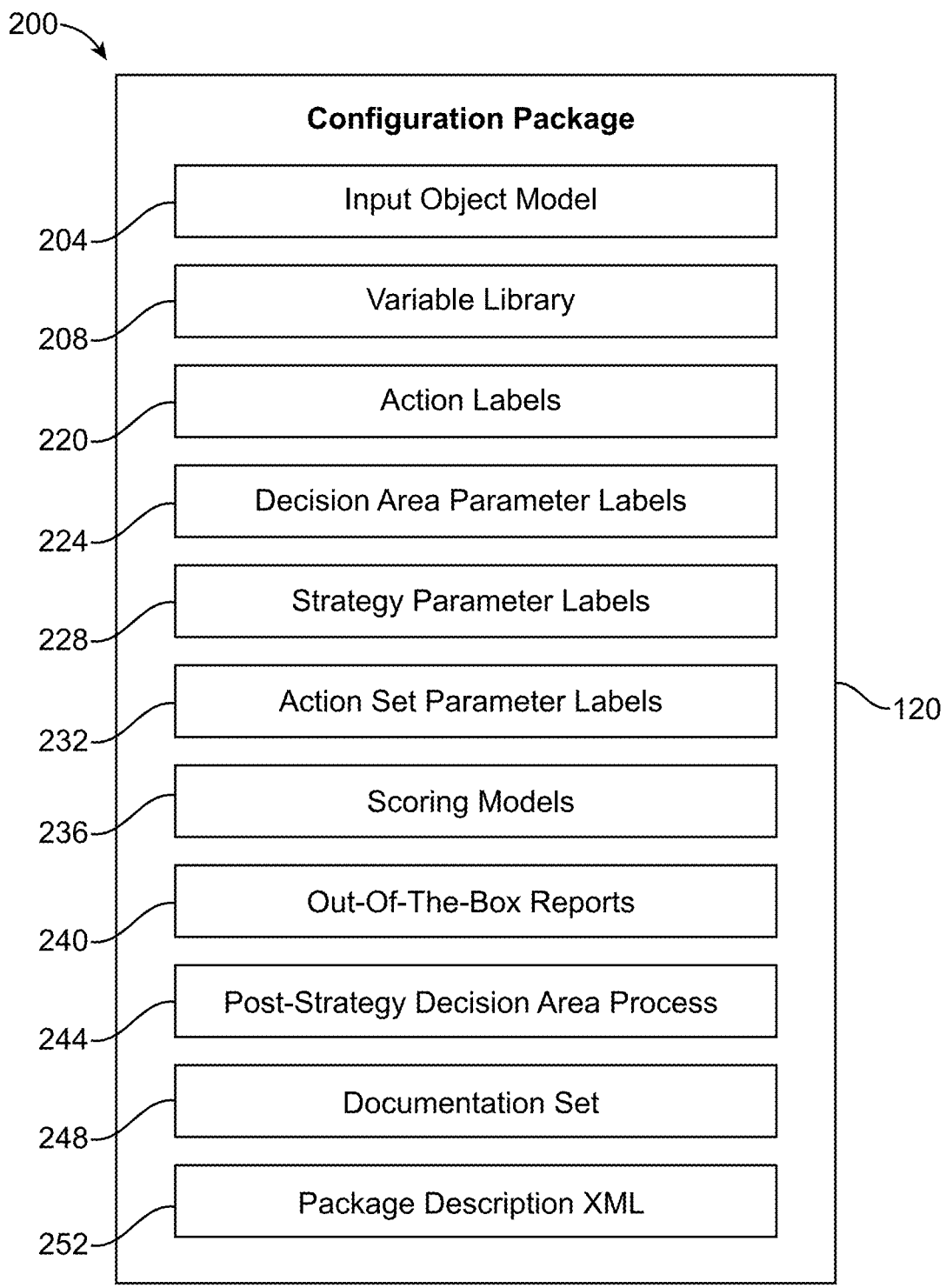
FIG. 2 is a diagram illustrating the configuration package containing a set of artifacts, according to one or more implementations of the current subject matter.

FIG. 2 is a diagram 200 illustrating a configuration package 120 containing a set of artifacts. The artifacts can be models, libraries, labels, etc. as described below. There can be any number or combination of artifacts in the configuration package 120 and the examples below are not intended to limit the number or type of artifacts used with the configuration package 120. The artifacts can be in a number of data formats, for example, XML, SRL, FSML, XSD, DB strings, MODEL BUILDER PROJECTS, BIRST files, PDF, etc.

In one implementation, there can be an input object model 204 included with the configuration package 120. The input object model 204 can define the entities made available to decision services, such as customer, account, transaction, or in other words the entity of focus, as well as the data elements that comprise them. The definition of "account" can be different for retail banking and, for example, telecom or healthcare or airlines, etc. The input object model 204 for an origination's configuration package 120 can include an application, not an account (though in other implementations it can also include accounts for the cases where the applicant already has accounts with the institution). The entity of focus may be dependent on the domain, and so it can be stored as data inside the configuration package 120, and is not hard-referenced in the code or out-of-the-box data repository structure. The input object model 204 can be stored as an XML (Extensible Mark-up Language) file, an industry standard method of defining data.

In one implementation, there can be a variable library 208 included with the configuration package 120. Domain-specific solutions require targeted variables that will also depend on the input object model 204. Some variables are standard and can be contained in the configuration package 120, and the balance of the library can be user definable, where the user can enter his/her own code through the UI. Variables can also be imported and exported as needed. The variable library will be different for different configuration packages 120. For example, revolving account management will have different needs, terminology and data than telecom. The former can have variables such as average account balance last 6 months, or maximum account delinquency last 12 months, and the latter can have average long distance minutes last 3 months, etc. Since the variable library 208 can be part of the configuration package 120, when users import the configuration package 120, they can therefore get a domain-specific variable library 208 that matches the input object model 204 (which is also in the configuration package 120). The variable library 208 can be stored as SRL, or "STRUCTURED RULE LANGUAGE," a proprietary language of FAIR ISSAC CORPORATION.

In one implementation, the user configuration 110 can include exclusions. Similar to variables, exclusion logic is a test on the value of a variable (e.g. if Variable A<5 then exclude; otherwise don't). Exclusions in a revolving account management configuration package 120 can include time on books<12 months, or account is more than 3 cycles delinquent, whereas in a telecom configuration package 120, it might be account age<12 months, or service is suspended, etc. Exclusions can be stored as SRL.

In one implementation, there can be inclusions included with the user configuration 110. Inclusions are similar to exclusions, above, only based upon variable analysis the variable is included rather than excluded.

By way of introduction to 220, 224, 228, and 232, decision area parameters may be holders for values that the decision process will use to make the decision. They may not be input fields, but they can be indirectly associated with the entity of focus (account, framework, etc.). In some embodiments, the entire configuration package 120 may be dependent on the entity of focus and the business problem being solved. For example, two configuration packages 120 in banking can have "account" as their entity of focus, but one might focus on checking accounts whereas the other might focus on credit cards. Each may have different decision area parameters. There are parameters provided at different levels:

decision area (so the values are set when you know what decision area you are doing, e.g. credit line management, fee waiver management, etc.), strategy (so the values are set when the strategy is set in the coarse classing step), action set (so the values are set in the fine classing step).

These parameters can be implemented in decision frameworks without configuration packages 120, or can be hard-wired into the framework code. The overarching idea is that there are some parameters you want to set at each of these three levels. They are all optional, and are referenced in the post-strategy decision area process, described below.

The configuration package 120 can include the labels for these things, but not the values themselves. The configuration package 120 can contain "cushion amount" and "over limit tolerance," etc., which are useful parameters to have when making an authorization decision, and "application cutoff age" is a useful parameter for an originations decision, etc., but the configuration package 120 does not have to specify what the actual percentage (or whatever) should be set to. The actual values can be set by the clients, and depend, for example, on how aggressive they are (or other factors coming from their strategic analyst roles) and can be subject to adjustment through time as part of champion/challenger testing. Clients set these parameters in the framework's user interface, and they are configuration, not customization.

In one implementation, there can be action labels 220 included with the configuration package 120. Labels can be used to label fields/values specific to a business problem or domain. Labels can also infuse proprietary software into configuration packages 120 by making most common actions and decision input parameters required to solve a business problem available and apparent to the user. For example, in a configuration package 120 for post-hospital discharge decisions, action labels 220 might reflect: nurse visits or doctor visit. In a debt collection setting, an action might recommend blocking the account, or routing to a collections queue. Labels can be stored as plain text in CSV (Comma Separated Values) format. The general features of labels described above can also apply to other types of labels described throughout the framework.

In one implementation, there can be decision area parameter labels 224 included with the configuration package 120. The decision area parameters, selected by the decision area parameter labels 224, are values made available to the decision process based on the decision area currently in process. Configuration packages 120 can contain multiple decision areas. For example, the configuration package 120 for deposit account decisions in retail banking may include decision areas for overdraft pay/no-pay decisions, fee waiver management, and deposit holds management, whereas the configuration package 120 for telecom may include decision areas for cross-sell, pricing and fee structure, account renewals, etc.

In one implementation, there can be strategy parameter labels 228 included with the configuration package 120. Strategy parameters, selected by the strategy parameter labels 228, are values made available to the decision process based on the strategy assigned to the entity of focus in the overall decision flow processing. Strategy assignment can occur in a coarse-classing preliminary decision step.

In one implementation, there can be action set parameter labels 232 included with the configuration package 120. Action set parameters can be values made available to the decision process based on the action set assigned in the executed strategy. Action sets can be assigned as a subsequent fine-classing decision step.

In one implementation, there can be scoring models 236 included with the configuration package 120. Whether and which predictive scoring models are delivered with initial installs is subject to licensing, so scoring models are optionally part of the configuration package 120. Scoring models 236 can be specific to a domain or business problem and can be chosen to include with the configuration package 120. In one implementation, scoring models 236 can be stored in the configuration package 120 as MODEL BUILDER/BLAZE ADVISOR projects, which is a FICO proprietary format. Models may also be stored in PMML (predictive Modeling Mark-Up Language), an industry standard specification of XML used to represent analytic scoring models.

In one implementation, there can be out-of-the-box reports 240 included with the configuration package 120. The out-of-the-box reports 240, can enable users to monitor and evaluate performance of the strategies supported by the configuration package 120. They can be generated per industry vertical and included in the configuration package 120. Out-of-the-box reports 240 can be stored in any format particular to the reporting package integrated into a decision template, for example BIRST, JASPER, or SAP BUSINESS OBJECTS, etc.

In one implementation, there can be a post-strategy decision area process 244 included with the configuration package 120. Following the execution of a strategy, further domain and business problem-specific items can be addressed the post-strategy decision area process 244 of the configuration package 120. By this stage in the process, the decision flow has processed general and decision area exclusions, strategy assignment (coarse classing), generated scores and other needed variables, etc., and performed fine segmentation in the strategy tree. At this point, some decision areas have specific logic that completes the decision processing, for example, credit facilities has logic to calculate the various limits, authorizations determines the accept-or-decline decision, etc. This logic can be stored in the configuration package 120 as SRL.

In one implementation, there can be a documentation set 248 included with the configuration package 120. Specific formats will be established in the development cycle and at the design level, but each package will have the documentation set 248 as a standard set of documents associated with and zipped up with the configuration package 120. The documentation set 248 can be in any format, e.g. MICROSOFT WORD, ADOBE PDF, etc., and describe the elements contained for the end-users.

In one implementation, there can be package description XML 252 included with the configuration package 120. Each configuration package 120 will have the package description XML 252 document and schema associated with it that will contain meta-data about the configuration package 120 such as domain, date-of-issue, versioning of each element, number and description of each element, etc. The package description XML 252 can be used in package features such as import and export, and may also be useful for customer support.

Figure 3:
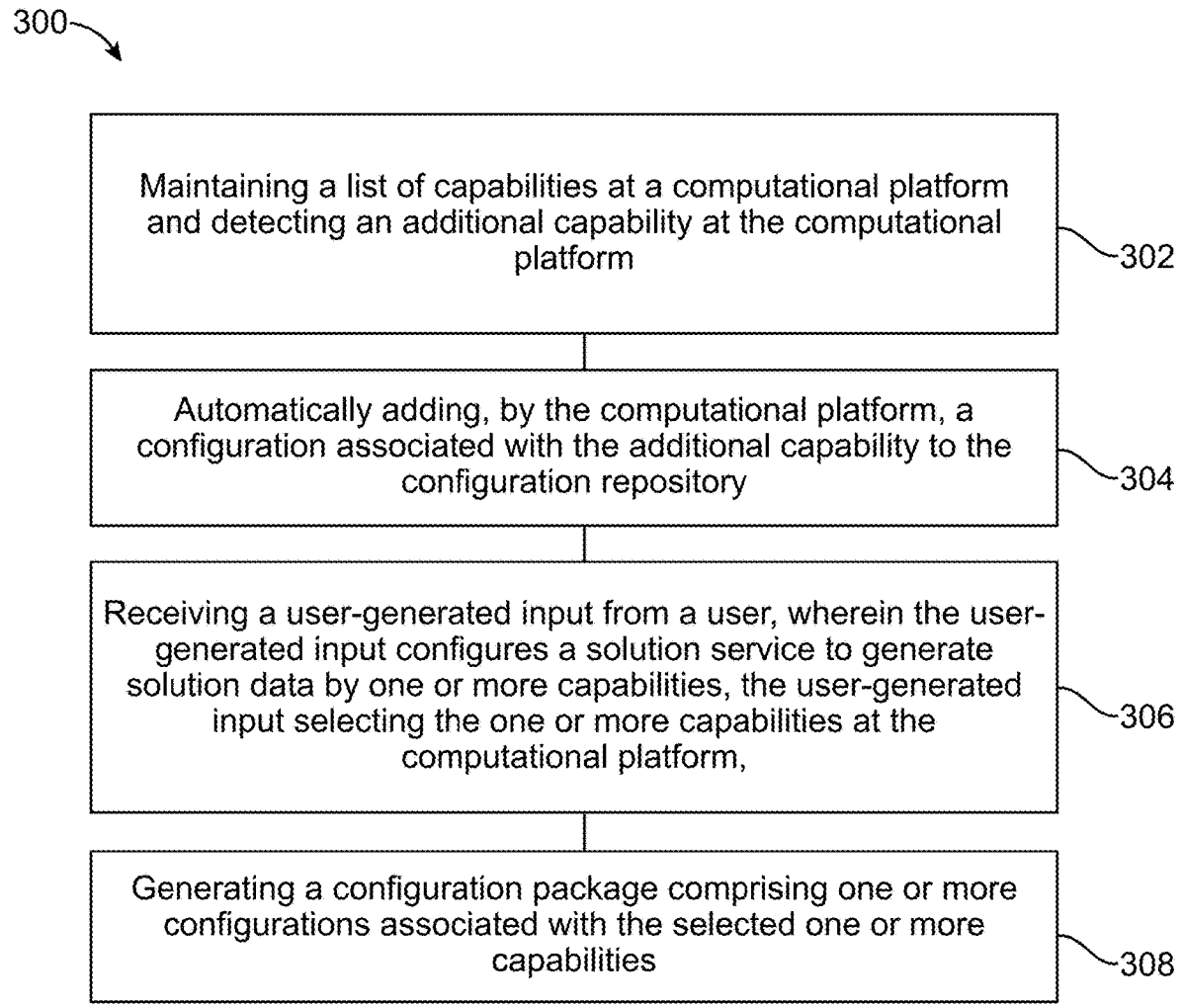
FIG. 3 is a process flow diagram illustrating a process for the platform and systems provided herein to generate configuration packages, according to one or more implementations of the current subject matter.

FIG. 3 is a process flow diagram illustrating a process 300 for the platform and systems provided herein to generate configuration packages, according to one or more implementations of the current subject matter. As shown in FIG. 3, the process 300 may beginning with operation 302, wherein a list of capabilities are maintained at a computational platform, and wherein the system may detect an additional capability is being added to the computational platform. Next, the process 300 may proceed to operation 304, wherein the computational platform may automatically add a configuration associated with the additional capability to the configuration repository. In an operation 306, the system may receive a user-generated input from a user. In some embodiments, the user-generated input may configure a solution service to generate solution data by one or more capabilities, and wherein the user-generated input may select the one or more capabilities at the computational platform. With the selected one or more capabilities, in some embodiments, the system may generate a configuration package comprising one or more configurations associated with the selected one or more capabilities. In some embodiments, a deployment service may be utilized to determine whether the one or more configurations are coherent with one another by deploying the one or more configurations as a group, and if they are coherent with one another, the system may generate the configuration package encompassing the one or more configurations. In some embodiments, the deployment service may generate executable code from the generated configuration package. In some embodiments, the packaging service may facilitate the user to publish generated configuration package, for example, at a virtual marketplace. In some embodiments, the packaging service comprised in the generated configuration package are agnostic to the list of capabilities at the computational platform. This may ensure adaptability and compatibility with evolving platform capabilities without necessitating constant adjustments or modifications to the configurations themselves. In some embodiments, the packaging service may manage recursive inclusion of a plurality of configuration packages, allowing one or more configuration packages to contain other configuration packages. For example, the recursive inclusion of the configuration packages comprises recursive inclusion by reference and/or recursive inclusion by copy.

Figure 4:
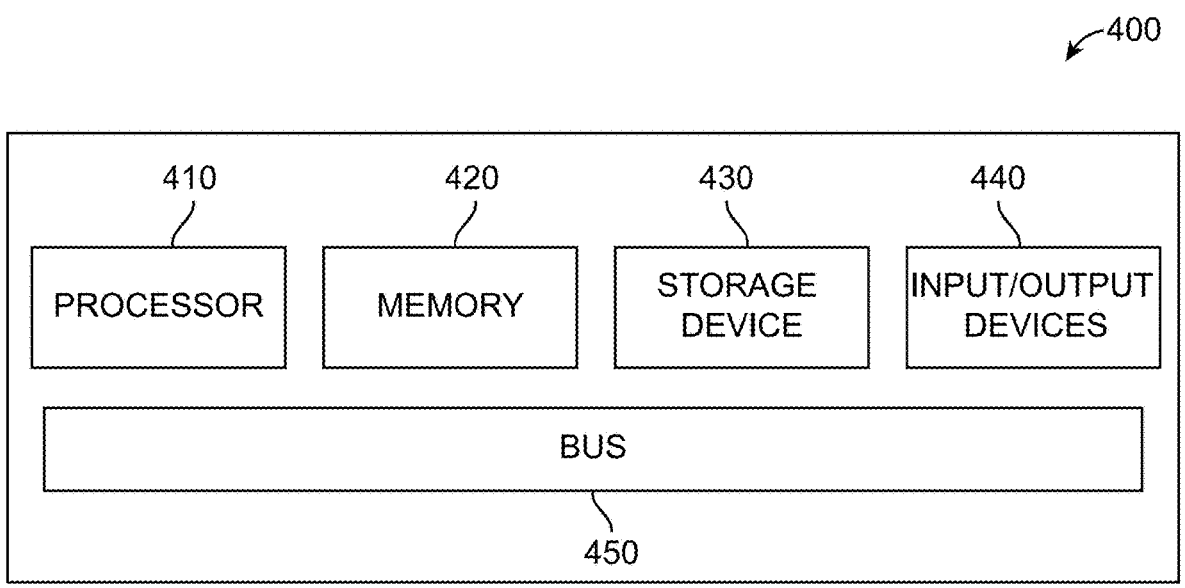
FIG. 4 depicts a block diagram illustrating an example of a computing system, consistent with implementations of the current subject matter.

FIG. 4 depicts a block diagram illustrating a computing system 400 consistent with implementations of the current subject matter. Referring to FIGS. 1-4, the computing system 400 can be used to implement the platform 100, the classifier developer system 120, the intervention module 124, and/or any components therein.

As shown in FIG. 4, the computing system 400 can include a processor 410, a memory 420, a storage device 430, and input/output devices 440. The processor 410, the memory 420, the storage device 430, and the input/output devices 440 can be interconnected via a system bus 450. The computing system 400 may additionally or alternatively include a graphic processing unit (GPU), such as for image processing, and/or an associated memory for the GPU. The GPU and/or the associated memory for the GPU may be interconnected via the system bus 450 with the processor 410, the memory 420, the storage device 430, and the input/output devices 440. The memory associated with the GPU may store one or more images described herein, and the GPU may process one or more of the images described herein. The GPU may be coupled to and/or form a part of the processor 410. The processor 410 is capable of processing instructions for execution within the computing system 400. Such executed instructions can implement one or more components of, for example, the diffusion system 100, the machine learning engine 110, the first machine learning model 120, the second machine learning model 125, and/or the like. In some implementations of the current subject matter, the processor 410 can be a single-threaded processor. Alternately, the processor 410 can be a multi-threaded processor. The processor 410 is capable of processing instructions stored in the memory 420 and/or on the storage device 430 to display graphical information for a user interface provided via the input/output device 440.

The memory 420 is a computer readable medium such as volatile or non-volatile that stores information within the computing system 400. The memory 420 can store data structures representing configuration object databases, for example. The storage device 430 is capable of providing persistent storage for the computing system 400. The storage device 430 can be a floppy disk device, a hard disk device, an optical disk device, or a tape device, or other suitable persistent storage means. The input/output device 440 provides input/output operations for the computing system 400. In some implementations of the current subject matter, the input/output device 440 includes a keyboard and/or pointing device. In various implementations, the input/output device 440 includes a display unit for displaying graphical user interfaces.

According to some implementations of the current subject matter, the input/output device 440 can provide input/output operations for a network device. For example, the input/output device 440 can include Ethernet ports or other networking ports to communicate with one or more wired and/or wireless networks (e.g., a local area network (LAN), a wide area network (WAN), the Internet).

In some implementations of the current subject matter, the computing system 400 can be used to execute various interactive computer software applications that can be used for organization, analysis and/or storage of data in various (e.g., tabular) format (e.g., Microsoft Excel®, and/or any other type of software). Alternatively, the computing system 400 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 440. The user interface can be generated and presented to a user by the computing system 400 (e.g., on a computer screen monitor, etc.).

One or more aspects or features of the subject matter described herein can be realized in digital electronic circuitry, integrated circuitry, specially designed framework specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software frameworks, frameworks, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on,"

above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for generating a configuration package, comprising:
    maintaining a list of capabilities at a computational platform, wherein the list of capabilities is associated with a list of configurations stored in a configuration repository;
    detecting, by one or more processors, an additional capability at the computational platform;
    automatically adding, by the computational platform, a configuration associated with the additional capability to the configuration repository;
    receiving, by a packaging service, a user-generated input from a user, wherein the user-generated input configures a solution service to generate solution data by one or more capabilities, the user-generated input selecting the one or more capabilities at the computational platform, and
    generating, by the packaging service, a configuration package comprising one or more configurations associated with the selected one or more capabilities.

2. The method of claim 1, wherein generating the configuration package further comprising:
    determining, by a deployment service, whether the one or more configurations are coherent with one another by deploying the one or more configurations as a group; and
    in response to the one or more configurations are coherent, generating the configuration package.

3. The method of claim 2, wherein the determination of whether the one or more configurations are coherent includes analyzing compatibility between configurations associated with the selected one or more capabilities.

4. The method of claim 2, wherein the deployment service generates executable code from the generated configuration package.

5. The method of claim 1, wherein the packaging service facilitates the user to publish the generated configuration package.

6. The method of claim 1, wherein the packaging service is agnostic to the list of capabilities at the computational platform.

7. The method of claim 1, wherein the packaging service is further configured to manage recursive inclusion of a plurality of configuration packages, allowing one or more configuration packages to contain other configuration packages.

8. The method of claim 7, wherein the recursive inclusion of a plurality of configuration packages comprises recursive inclusion by reference.

9. The method of claim 7, wherein the recursive inclusion of a plurality of configuration packages comprises recursive inclusion by copy.

10. The method of claim 7, wherein the packaging service is further configured to prevent self-referential recursiveness.

11. The method of claim 1, wherein the generated configuration package further comprises version information for the one or more configurations.

12. The method of claim 11, wherein the packaging service provides an interface for displaying historical edit data of the one or more configurations in the version information.

13. The method of claim 12, wherein the packaging service is configured to restore a past version of a configuration of the one or more configurations in response to a user request received via the interface.

14. The method of claim 1, wherein the packaging service is further configured to validate the generated configuration package by processing input data and comparing actual output with expected output data.

15. The method of claim 1, further comprising:
    processing a set of input data by the generated configuration package to generate a set of actual output;
    comparing the set of actual output with expected output to generate a comparison; and
    modifying the generated configuration package based on the comparison to generate modified configuration package.

16. A computer program product comprising a non-transient machine-readable medium storing instructions that, when executed by at least one programmable processor, cause the at least one programmable processor to perform operations comprising:
    maintaining a list of capabilities at a computational platform, wherein the list of capabilities is associated with a list of configurations stored in a configuration repository;
    detecting, by one or more processors, an additional capability at the computational platform;
    automatically adding, by the computational platform, a configuration associated with the additional capability to the configuration repository;
    receiving, by a packaging service, a user-generated input from a user, wherein the user-generated input configures a solution service to generate solution data by one or more capabilities, the user-generated input selecting the one or more capabilities at the computational platform, and
    generating, by the packaging service, a configuration package comprising one or more configurations associated with the selected one or more capabilities.

17. The computer program product of claim 16, wherein the operation of generating the configuration package further comprising:
    determining, by a deployment service, whether the one or more configurations are coherent with one another by deploying the one or more configurations as a group; and
    in response to the one or more configurations are coherent, generating the configuration package.

18. The computer program product of claim 17, wherein the determination of whether the one or more configurations are coherent includes analyzing compatibility between configurations associated with the selected one or more capabilities.

19. A system comprising:
a programmable processor; and
a non-transient machine-readable medium storing instructions that, when executed by the processor, cause the programmable processor to perform operations comprising:
  maintaining a list of capabilities at a computational platform, wherein the list of capabilities is associated with a list of configurations stored in a configuration repository;
  detecting, by one or more processors, an additional capability at the computational platform;
  automatically adding, by the computational platform, a configuration associated with the additional capability to the configuration repository;
  receiving, by a packaging service, a user-generated input from a user, wherein the user-generated input configures a solution service to generate solution data by one or more capabilities, the user-generated input selecting the one or more capabilities at the computational platform, and
  generating, by the packaging service, a configuration package comprising one or more configurations associated with the selected one or more capabilities.

20. The system of claim 19, wherein the operation of generating the configuration package further comprising:
  determining, by a deployment service, whether the one or more configurations are coherent with one another by deploying the one or more configurations as a group; and
  in response to the one or more configurations are coherent, generating the configuration package.

* * * * *